(12) United States Patent
Chen et al.

(10) Patent No.: US 6,756,978 B1
(45) Date of Patent: Jun. 29, 2004

(54) APPARATUS AND METHOD FOR SHARING ANTIALIASING MEMORY ACROSS MULTIPLE DISPLAYS

(75) Inventors: Edward C. Chen, Los Altos, CA (US); Michael T. Jones, San Jose, CA (US); Mark Stefan Grossman, Palo Alto, CA (US); Philippe G. Lacroute, Sunnyvale, CA (US); John Montrym, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/294,450

(22) Filed: Apr. 19, 1999

(51) Int. Cl.[7] .............................................. G06T 15/00
(52) U.S. Cl. ...................................... 345/419; 345/441
(58) Field of Search .............................. 345/419, 421, 345/422, 426, 427, 428, 441, 443, 501, 502, 505, 506, 522, 530, 531, 536, 537, 545, 552, 557, 559, 560, 564, 582, 589, 592, 611, 612, 614

(56) References Cited

U.S. PATENT DOCUMENTS

| | | | | |
|---|---|---|---|---|
| 5,742,788 A | * | 4/1998 | Priem et al. ................ | 395/437 |
| 5,742,796 A | * | 4/1998 | Huxley ........................ | 395/502 |
| 5,850,489 A | * | 12/1998 | Rich ........................... | 382/304 |
| 6,018,340 A | * | 1/2000 | Butler et al. ................ | 345/339 |

* cited by examiner

Primary Examiner—Almis R. Jankus
(74) Attorney, Agent, or Firm—Woodcock Washburn LLP (57) ABSTRACT

A computer-implemented method for generating three-dimensional images by reusing multisample memory. Pixels corresponding to a first section of the overall display are multisampled. The multisampled pixel values corresponding to the first section of the display are stored in a multisample memory. The final pixel values corresponding to the first section of the display are stored in a frame buffer. Thereupon, multisampling is performed on those pixels belonging to a second section of the overall display. The same multisample memory is reused to store the multisampled pixel values corresponding to the second section of the display. In other words, the same piece of multisample memory is shared between the first and second portions of the display, thereby minimizing the amount of multisample memory that is needed. The final pixel values corresponding to the second section of the display are stored in the frame buffer. This process is repeated until multisampling has been performed over the entire display area. Meanwhile, pixel values from the frame buffer are being rendered out for display.

17 Claims, 5 Drawing Sheets

Shallow (Display) Memory

Deep (Multisample) Memory

FIG. 5

APPARATUS AND METHOD FOR SHARING ANTIALIASING MEMORY ACROSS MULTIPLE DISPLAYS

FIELD OF THE INVENTION

The present invention relates to an apparatus and method for sharing and reusing a section of multisample and/or antialiasing memory amongst multiple displays.

BACKGROUND OF THE INVENTION

Computer graphics is used in a wide variety of applications, such as in business, science, animation, simulation, computer-aided design, process control, electronic publication, gaming, medical diagnosis, etc. In an effort to portray a more realistic real-world representation, three dimensional objects are transformed into models having the illusion of depth for display onto a two-dimensional computer screen. This is accomplished by using a number of polygons to initially form a basic surface "mesh" representation of a three-dimensional object. Next, texture is selectively applied to the polygons to give the object the appearance of solidity. In addition, hidden or obscured surfaces, which are normally not visible, are eliminated from view. Finally, lighting, shading, shadowing, translucency, and blending effects are applied. The end result is a three-dimensional image rendered for display.

Although the general principles behind generating three-dimensional images are well known, it nevertheless requires specialized know-how in order to generate highly detailed, realistic, and visually appealing three-dimensional graphics scenes. One of the problems relates to the way images are eventually displayed on a computer screen. A computer screen is physically comprised of millions of picture elements, known as "pixels." For example, high resolution displays typically contain an array of 1280×1024 pixels. Each of these million pixels is instructed to display a certain color. The computer system generates a color value (e.g., red, green, and blue—RGB) for each of the individual pixels. The colors emanating from each of the million pixels are what eventually form the three-dimensional images.

However, during a scan conversion process, instances often arise whereby a pixel belongs to more than one polygon. In other words, a pixel may be split between two or more polygons. In which case, assigning the pixel a color corresponding to just one of the polygons, and not to any of the other polygon(s), is inaccurate because each of the overlapping polygonal portions contribute to that pixel'as color. These pixel discrepancies produce unwanted visual artifacts and seriously degrade the generated three-dimensional images.

In an effort to minimize these discrepancies and artifacts, antialiasing (e.g.; A buffer, fragment-based techniques, and other shared storage techniques) have been developed. One technique known as "multisampling," or multisample antialiasing is particularly effective. Rather than basing a pixel'as characteristics according to its centerpoint, multiple points dispersed throughout the pixel are used to "sample" the characteristics at those particular locations. The characteristics for each of the multiple sample points are then averaged, weighted, or otherwise combined to produce a final result. It is this final result which is rendered for display. For example, suppose that a pixel is covered by three polygons. The pixel could have eight sample points dispersed therein. Three sample points might fall in the first polygon; two sample points might fall in the second polygon; and three sample points might fall in the third polygon. In this example, the color value for the pixel would be the average of three-eighths of the color of the first polygon, two-eighths of the color of the second polygon, and three-eighths of the color of the third polygon. By rendering multisampled pixel values, a more accurate, smoother, and visually appealing three-dimensional display is produced.

Unfortunately, one drawback to using multisampling is that a great amount of additional memory is required to store the multisample point values. For instance, if eight sample points per pixel are used for multisampling, the extra amount of memory required to handle these sample points is eight times greater than that for traditional non-multisampled pixel rasterization. Moreover, utilizing more sample points per pixel yields better results because of its finer resolution and precision. However, having more sample points correspondingly requires that much more memory be available. Furthermore, a sample point often has more than just a corresponding color value. A single sample point typically has eight bits per color (RGBA)=32 bits; plus 32 bits of depth (Z); and 8 stencil bits. Thus, multisampled memory is considered to be "deep" in that many different values must be stored for each sample point of each of the pixels. In addition, there are some applications, such as multi-channel visual simulation and location-based entertainment (e.g., flight simulators), whereby extremely large amounts of multisample buffer memory is needed for rendering each of the channels or display screens.

Incorporating the requisite amount of multisampling memory and hardware is cost prohibitive for most general applications. Consequently, multisampling has hitherto tended to be limited to expensive, high-end graphics workstations and computers. Thus, there is a need for a more economical mechanism for providing multisampling.

The present invention provides one unique solution whereby the amount of memory required for multisampling is minimized. This enables the enhanced benefits conferred by multisampling to be achieved on much less expensive computing platforms. The present invention accomplishes this by having a portion of multisampling memory be shared or reused across one or more display areas. Rather than having one huge multisampling memory for storing all of the multisample point values for all of the display pixels, the present invention contemplates reusing a relatively small piece of multisample memory to perform the multisampling for various displays.

SUMMARY OF THE INVENTION

The present invention pertains to a computer-implemented method for generating three-dimensional images by reusing or sharing multisample memory. Pixels corresponding to a first region of the overall display are multisampled. The multisampled pixel values corresponding to this first region of the display are stored in a multisample and/or antialiasing memory. Final pixel values corresponding to the first region of the display are generated based on their multisampled values and then stored in the first region of a traditional frame buffer. Next, multisampling is performed on those pixels belonging to a second region of the overall display. The same multisample memory is reused in order to store the multisampled pixel values corresponding to the second region of the display. The final pixel values corresponding to the second region of the display are then stored in the frame buffer. This process is repeated until multisampling has been performed over the entire display area. Meanwhile, pixel values from the frame buffer are being scanned out for display.

Thereby, the same piece of multisample memory is shared between the first and second region of the display, which minimizes the amount of multisample memory that is needed. Rather than having one large, all-encompassing multisample memory which covers the entire display, the present invention contemplates utilizing a smaller multisample memory which is big enough to only cover one region of the display. This smaller multisample memory can be reused to successively perform multisampling on different sections of the overall display until the entire display area has been multisampled.

BRIEF DESCRIPTION OF THE DRAWINGS

The operation of this invention can be best visualized by reference to the drawings.

DETAILED DESCRIPTION

An apparatus and method for sharing and reusing multisample memory across different displays and display portions is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
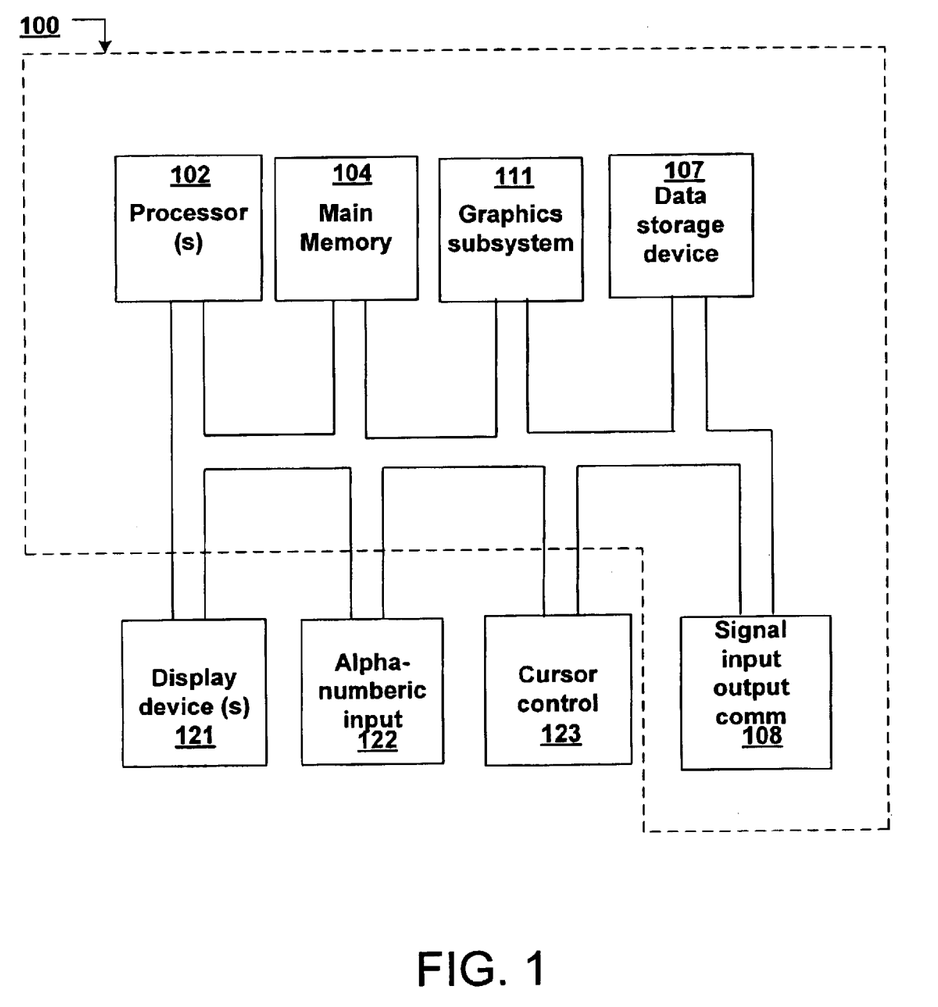
FIG. 1 shows a computer graphics system upon which the present invention may be practiced.

Referring to FIG. 1, a computer graphics system upon which the present invention may be practiced is shown as 100. System 100 can include any computer controlled graphics systems for generating complex two-dimensional or three-dimensional images. Computer system 100 comprises a bus or other communication means 101 for communicating information, and one or more processor(s) 102 coupled to bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Data storage device 107 is coupled to bus 101 for storing information and instructions. Furthermore, an I/O device 108 is used for coupling the computer system 100 onto a network.

Computer system 100 can also be coupled via bus 101 to an alphanumeric input device 122, including alphanumeric and other keys, and is typically coupled to bus 101 for communicating information and command selections to processor 102. Another type of user input device is cursor control 123, such as a mouse, a trackball, or cursor direction keys for communicating direction information and command selections to processor 102 and for controlling cursor movement. This input device typically has two degrees of freedom in two axes, a first axis (e.g., x) and a second axis (e.g., y), which allows the device to specify positions in a plane.

Also coupled to bus 101 is a graphics subsystem 111. Processor 102 provides the graphics subsystem 111 with graphics data such as drawing commands, coordinate vertex data, and other data related to an object's as geometric position, color, and surface parameters. The object data is processed by graphics subsystem 111 in the following pipelined stages: geometry subsystem, scan conversion subsystem, raster subsystem, and a display subsystem. The geometry subsystem converts the graphical data from processor 102 into a screen coordinate system. The scan conversion subsystem then generates pixel data based on the primitives (e.g., points, lines, polygons, and meshes) from the geometry subsystem. The pixel data is sent to the raster subsystem, whereupon z-buffering, blending, texturing, and anti-aliasing functions are performed. The resulting pixel values are stored in a frame buffer memory. The display subsystem reads the frame buffer memory and displays the image on one or more display monitors 121. It should be noted that the present invention applies to single as well as double buffered frame buffer systems.

In the present invention, graphics subsystem 111 performs multisampling. Rather than having a multisample memory for temporarily storing multisample data for each of the pixels corresponding to each of the displays 121, the present invention contemplates using a smaller piece of multisample memory. It should be noted that the term multisampled memory also includes antialiasing memory/ This smaller multisample memory is shared between the displays or even between portions of the same display. For example, if there are two displays, then there could be one multisample memory sized for storing multisample data for just one display. When the pixels are rendered for display on the first display screen, the multisample memory temporarily stores the multisample values. Once the final averaged or weighted pixel values are determined, the final pixel values are stored in a separate "shallow" memory (e.g., frame buffer memory). The image is then drawn for display from the shallow memory. When the image corresponding to the second display is being rendered, the same piece of multisample memory is reused. In other words, the multisample data corresponding to the pixels of the second display is temporarily stored in the same multisample memory which had previously contained multisample data corresponding to the first display. The data previously stored in the multisample memory corresponding to the first display is either cleared or simply overwritten. The final pixel data for the second display is then stored in another piece of shallow memory. The process then repeats with multisampling being performed for the first display, etc.

In the currently preferred embodiment of the present invention, eight multisample points are used for each pixel. For each of the multisample points: eight bits are used to represent each of the red, green, blue, and alpha color attributes; thirty-two bits are used to represent the depth or Z value; sixty-four bits are used for the accumulation buffer; and eight bits are used for the stencil buffer. For this embodiment, there are a total of 1,088 bits of multisample data per pixel. It should be noted that the present invention encompasses using different numbers of bits, values, attributes, sample points, etc. Furthermore, in the currently preferred embodiment, a unified memory architecture is used whereby a single piece of memory is used to store all types and formats of data including, but not limited to frame buffer memory, image memory, texture memory, etc. The unified memory consists of dynamic random access memory (DRAM) which is dynamically allocated to function as a main memory, graphics memory (e.g., texture), image processing (e.g., frame buffer memory), etc. The type of data stored in the memory depends on its allocation within the memory and how it is referenced and/or addressed. A unified memory architecture is described in great detail in the patent application entitled, "A Unified Memory Computer Architecture With Dynamic Graphics Memory Allocation," filed Sep. 13,1996, Serial No. 08/713,779 and which is incorporated by reference in its entirety herein. In addition, the present invention is applicable to multisampling, A-Buffering, area sampling, point sampling, oversampling, and any other techniques whereby multiple points, fragments, and/or samples are considered when processing a pixel.

Figure 2:
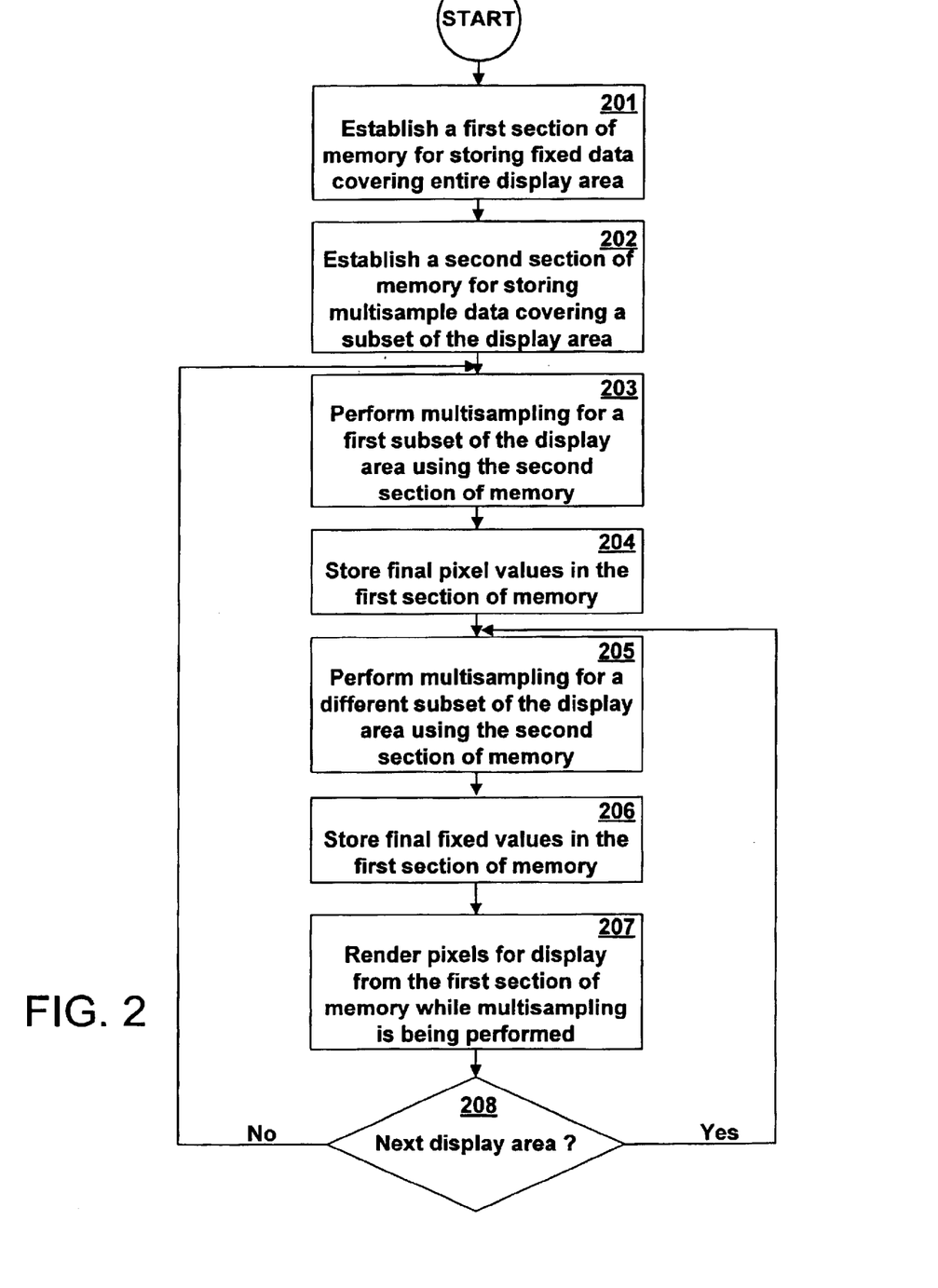
FIG. 2 is a flowchart describing in detail the steps for performing the process for reusing multisample memory.

FIG. 2 is a flowchart describing in detail the steps for performing the process for reusing multisample memory. Initially, two sections of frame buffer memory are established, steps 201 and 202. A first "shallow" section of memory is established to store final pixel values, step 201. This shallow section of memory covers the entire viewable display area. For instance, if there are four channels driving four different monitors, the shallow section of memory contains the pixel values being rendered for display onto all four of the monitors. A second "deep" section of memory is established, especially for performing multisampling, step 202. This deep section of memory covers only a subset of the viewable display area. For instance, the "deep" section of memory might only be able to store the multisample data generated for just one of the four display screens. Hence, the deep section of memory is iteratively reused so that the final pixel values can be calculated for the entire display area. This is accomplished by steps 203–207.

In step 203, multisampling is performed for pixels corresponding to a first subset of the display area. The display area can be divided according to different display monitors, windows of the same or different monitors, different boundaries within the same monitor, or to any arbitrary subdivision of the display area. If depth buffering is being done at the multisample level, the depth (Z) valves in the "deep" memory must first be initialized to avoid using valves written during some previous use of the memory. The multisampled values are temporarily stored in the second section of "deep" memory. The final pixel values resulting from the multisampling process is then stored in the first section of "shallow" memory, step 204. Next, multisampling is performed for a different portion or subset of the display area, step 205. The multisampled values are stored in the second section of memory. It should be noted that the same second section of "deep" memory is used for both steps 203 and 205 in that this same second section of memory is used to store multisample values corresponding to the pixels of one portion of the display area and then stores multisample values corresponding to the pixels of another, different portion of the display area. The final pixel values corresponding to the subset of the display area is then stored in the first section of the memory, step 206. Meanwhile, the pixels from the first section of memory is constantly being rendered out for display, even while multisampling is being performed, step 207. Note that the first section of memory is a frame buffer containing all the final pixel values for each of the pixels of the entire display area. In step 208, a determination is made as to whether there is another portion of the display area which has yet to be multisampled. If all portions of the display area has been multisampled, the process repeats with step 203. Otherwise, multisampling is performed on the next portion of the display area by repeating step 205. In other words steps 205 and 206 are repeated until all subsets of the entire display area have been subsampled; at which point, the process repeats with steps 203–208.

Figure 3:
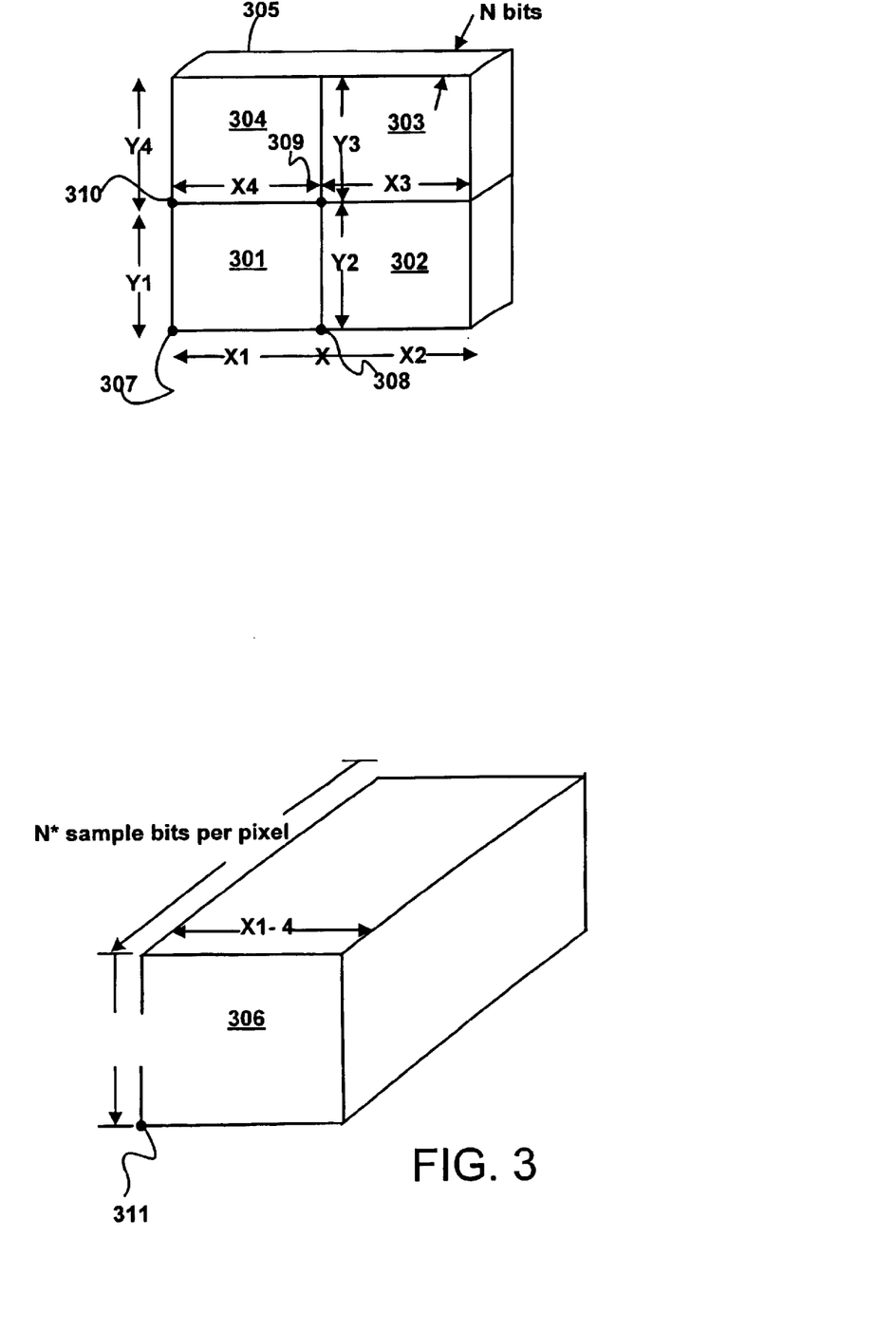
FIG. 3 shows an example of a screen area and the applicable multisample memory space according to one embodiment of the present invention.

FIG. 3 shows an example of a screen area and the applicable multisample memory space according to one embodiment of the present invention. In this example, the display area is comprised of four display screens, shown as 301–304. Each of the display screens 301-304 has pixels; a pixel is identified by its (x, y) coordinate. A first section of memory, referred to herein as the shallow memory, is shown as 305. Memory section 305 stores all the final pixel attributes for the entire display area 301–304. Memory section 305 stores N bits per pixel comprising primarily the final rendered and displayed color bits; but it may also contain other non-multisampled pixel attributes(e.g., depth bits, accumulation buffer bits, stencil bits, etc.). The images for screens 301–304 are rendered from the pixel values contained in the shallow frame buffer memory 305.

A separate section of memory, herein referred to as the "deep" memory, is shown as 306. Deep memory 306 is used for performing multisampling. In X-sample multisampling, each pixel is sampled X number of times. Accordingly, there are on the order of X times the number of bits per pixel. This means that there are roughly N X bits per pixel which need to be stored in the multisample section of memory. In the prior art, the computer system would necessarily have a multisample section of memory reserved which is X times larger than that of the traditional frame buffer memory containing the final pixel values. However, in the present invention, only a portion of the display area 301–304 is covered by the multisample section of memory 306. For instance, multisample memory 306 covers the pixels associated with just one of the four display screens 301–304. Initially, multisampling is performed for display screen 301. The multisample values are stored in deep memory 306. The final pixel values are calculated and stored in shallow memory 305. In fact, the final pixel values are stored in the section of memory 305 which corresponds to display screen 301.

Thereupon, multisampling is performed for display screen 302. The multisampled pixel values for display screen 302 are stored in the same multisample memory 306. The previously stored multisampled values corresponding to display screen 301 can now be discarded since the final values have already been stored in memory 305. It should be noted that only the final pixel attributes, and not the multisampled values, are used to render the image. The multisampled values are only used to calculate the final pixel values. Once the final pixel values have been calculated for display screen 302, they are stored in the shallow frame buffer memory 305. In particular, the final pixel values are stored in the section of memory 305 which corresponds to display screen 302.

Next, multisampling is performed for display screen 303. The multisampled pixel values for display screen 303 are stored in the multisample memory 306; the multisampled values for display screen 302 are discarded or overwritten. When the final pixel values have been calculated for display screen 303, they are stored in the area of memory 305 corresponding to display screen 303. Next, multisampling is performed for display screen 304. The multisampled pixel values for display screen 304 are stored in the multisample memory 306; the multisampled values for display screen 303 are discarded or overwritten. When the final pixel values have been calculated for display screen 304, they are stored in the area of memory 305 corresponding to display screen 304. The process then begins anew with multisampling for display screen 301, followed by display screens 302, 303, and 304. Therefore, instead of needing X times the amount of multisample memory, the present invention only requires X/(number of subdivided sections) times the amount of multisample memory.

In the currently preferred embodiment, the multisample memory 306 is assigned to handle different display screens and/or areas by changing the address or pointer into the memory. For example, a pixel 307 of screen 301 has an address or pointer for coordinate (x1, y1). The multisampled bit values for pixel 307 is stored in location 311 of multisample memory 306. Likewise, the multisampled bit values corresponding to pixel 308 at location (x2, y2) of display screen 302 is also stored in location 311 of multisample memory 306. The multisampled bit values corresponding to pixel 309 at location (x3, y3) of display screen 303 is stored in location 311 of multisample memory 306; and the multisampled bit values corresponding to pixel 310 at location (x4, y4) of display screen 304 is also stored in location 311 of multisample memory 306.

Figure 4:
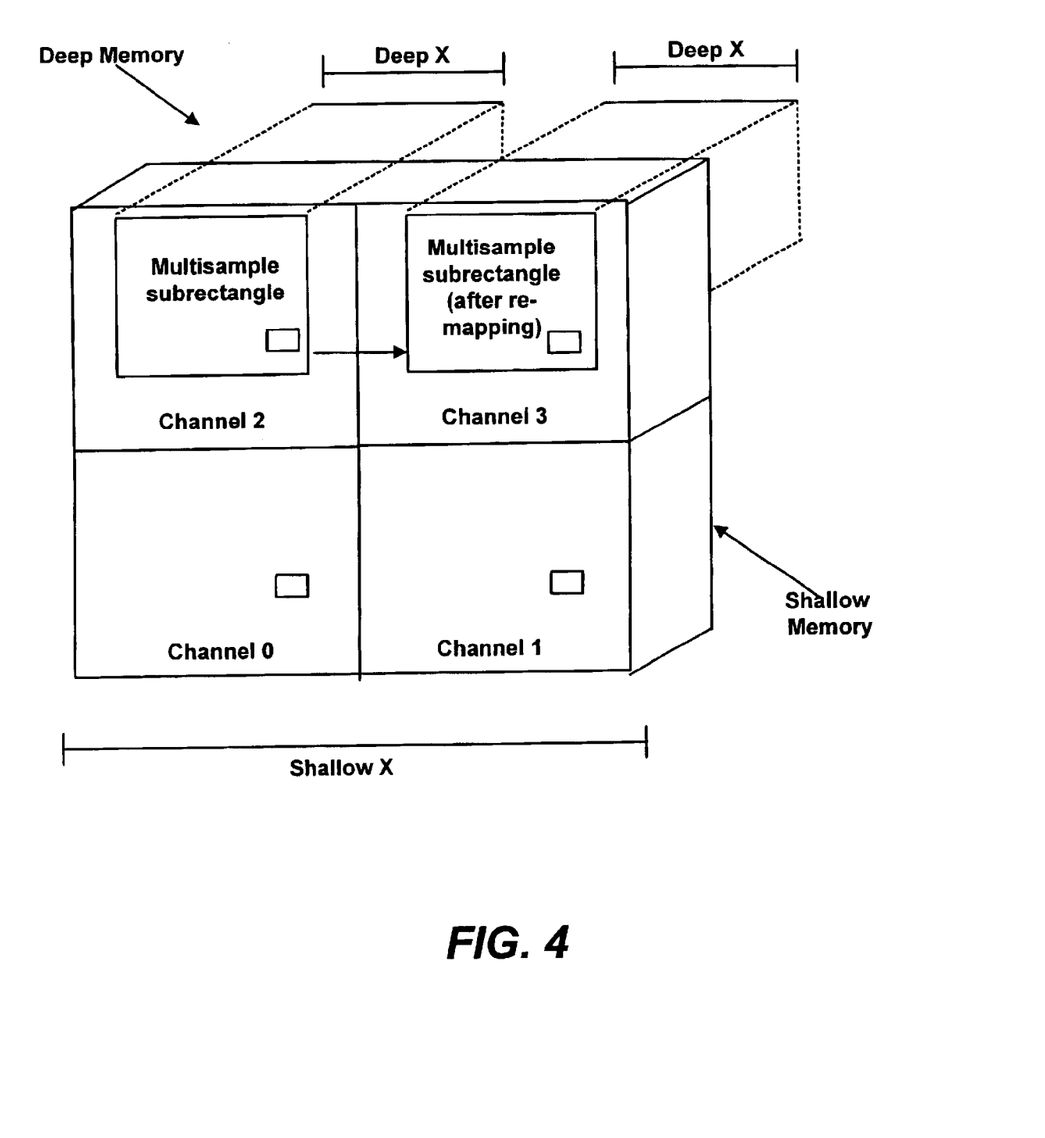
FIG. 4 shows a memory space which may be partitioned to accommodate shared or reused multisample storage.

FIG. 4 shows a memory space which may be partitioned to accommodate shared or reused multisample storage. For multi-channel visual simulation and location-based entertainment (LBE) applications, the large amounts of multisample buffer memory needed to cover the entire managed area is an obstacle to achieve better cost-per-head ratios. The present invention of a shared multisample feature, addresses this issue by allowing a single instance of multisample buffer to be shared between different channels. This is possible since visual simulation applications render each channel sequentially, with a clear before each and every frame. The application manages the limited multisample memory available to avoid any accidental trashing. To support the shared multisample invention, and to better utilize the available random access chip memory, the frame buffer is divided into two types of memory: shallow and "deep". The characteristics of the two types of memory are as follows. In the currently preferred embodiment, the shallow memory has 128 (minimum), 256, or 512 bits per pixel; covers the entire managed area; contains all visible (resolved) color buffers; and can contain accumulation and auxiliary buffers. The "deep" memory contains 0, 256, 512, or 1024 bits per pixel; it contains all multisample buffers (e.g., color, stencil, and depth) and can contain accumulation and auxiliary buffers (in normal mode).

Furthermore, there are two modes of memory allocation: normal and shared. In normal mode, both the shallow memory and "deep" memory must cover the entire managed area. The shallow/deep memory structure allows non-power-of-two pixel sizes for better memory utilization. The following pixel sizes are supported through various combinations of shallow/"deep" memory: 128, 256, 384, 512, 640, 768, etc. Normal is the default mode of operation. In the shared mode of operation, the "deep" memory can be arbitrarily sized, while the shallow memory still needs to cover the entire managed area. The software programs the particular mapping between "deep" and shallow memories. In one embodiment, the "deep" memory is automatically tiled/aliased across the shallow memory.

As shown in the shared memory allocation of FIG. 4, at any point in time, the "deep" memory region (also referred to as the multisample subrectangle), can be mapped to any region within the managed area/shallow memory. During rendering state changes or context switches, the multisample subrectangle can be re-mapped to a different channel, or to a different region within the same channel or window. It is up to the software to clip all rendering outside of the multisample subrectangle, as pixels written outside of the multisample subrectangle will trash other memories. Note also that since "deep" memory in now a shared resource between different channels, it will be trashed when it is re-mapped. Software can select whether to place the buffers in shallow or "deep" memory in shared mode, with the realization that anything placed in "deep" memory will be trashed when it is re-mapped.

In the currently preferred embodiment, the present invention is implemented as part of a software interface for controlling graphics hardware. One such programming interface is the OpenGL graphics library. According to the OpenGL implementation of the present invention, pixel sizes (pixel_depth_sh for Shallow, and pixel_depth_dp for "deep") and mode of operation (Normal or Shared, see below) are determined during windowing system startup time. They cannot be changed unless the windowing system is restarted. On window system startup, the following registers must be set. The registers point to the beginning of Shallow and "deep" memory, as well as the stride:

O sh_rcellbase—Starting Address for Shallow memory.

O dp_rcellbase—Starting Address for "deep" memory.

O sh_tpl—Pixels per line for Shallow memory.

O dp_tpl—Pixels per line for "deep" Memory.

The system is in Normal mode if sh_tpl==dp_tpl, otherwise it is in Shared mode. Further, the following registers must be set between every context switch or rendering state change while in Shared mode:

O dp_x_offset—x-axis offset of "deep" from Shallow memory. For Shared Mode only.

O dp_y_offset—y-axis offset of "deep" from Shallow memory. For Shared Mode only.

An (x, y) screen coordinate pair is generated when drawing any pixel fragment of any graphical primitive. This (x, y) pair is used along with the registers described above to produce two memory addresses—one in shallow memory, and one in "deep" memory—that together represent all the data for that (x, y) coordinate as the primitive is drawn. For Shallow memory, the translation from (x, y) to memory address is as follows:

$XY\_shallow=(sh\_tpl*y)+x$ $Addr\_shallow=sh\_rcellbase+(XY\_shallow*pixel\_depth\_sh)$ For "deep" memory, the calculations are very similar. In Normal Mode (where sh_tpl equals dp_tpl) dp_x_offset and dp_y_offset are used to perform the correspondence between shallow and "deep" pixel addresses as follows:

$shared\_x=x+dp\_x\_offset;$ $shared\_y=y+dp\_y\_offset;$

Note that the arithmetic is unsigned and the addresses are allowed to wrap. This way there is no restriction in the direction of the offset. The rest of the address calculation is similar to that for Shallow memory:

$XY\_deep=(dp\_tpl*shared\_y)+shared\_x$ $Addr\_deep=dp\_rcellbase+(XY\text{-}deep*pixel\_depth\_dp)$ All displayable color buffers are required to reside in Shallow memory. All multisamples reside in "deep" memory. All other buffers (e.g. auxiliary, accumulation, or "p" buffers)

may reside in either memory. There is a way for the hardware to know whether to perform Shallow or "deep" address calculation for the current buffer. This is controlled via a destination select register state. The software explicitly controls where the current buffer (s) are located by setting this state correctly.

Figure 5:
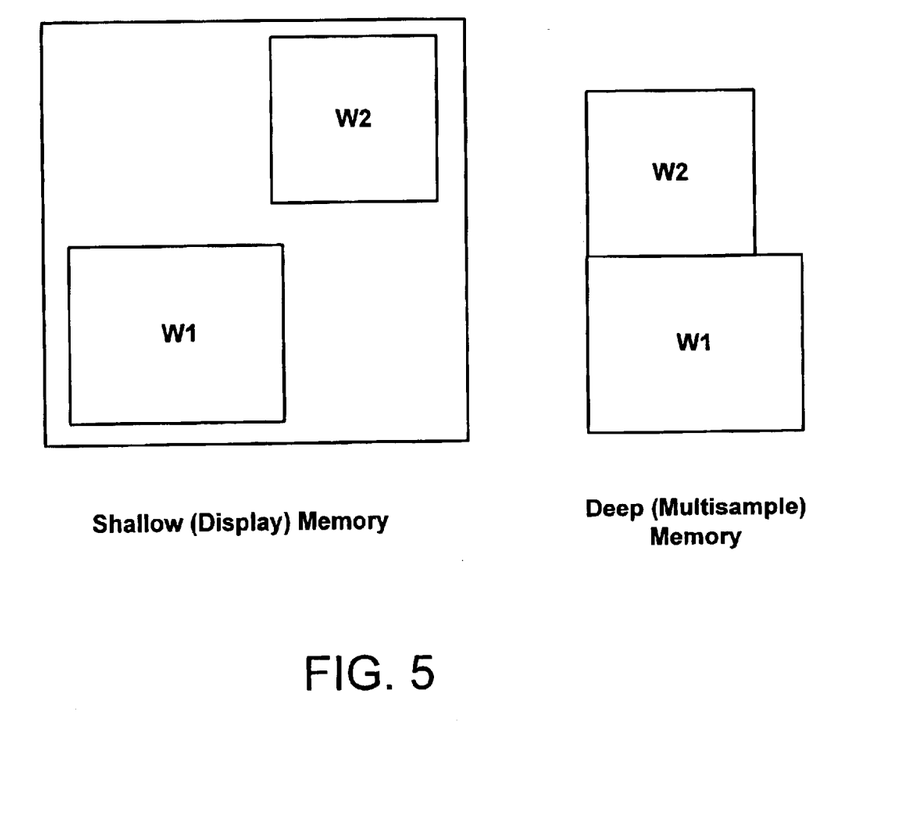
FIG. 5 shows a windowed display which may benefit from the multisampling scheme of the present invention.

In one embodiment, the present invention is practiced in a windowed environment. FIGS. 4 and 5 show two examples of a windowed display which may benefit from the multi-sampling scheme of the present invention. In a typical windowed environment, the entire frame buffer managed area must retain multisample state because windows can be moved dynamically and resized (up to the entire size of the managed area). For LBE applications though, the layout of channel subrectangles in the frame buffer managed area is static, such as shown in FIG. 4, and the LBE application monopolizes the graphics device (i.e., no other concurrent windowed applications). Because of their channel-oriented, dedicated, cost-sensitive nature, LBE applications can benefit from the present invention'as means to share the available multisample memory resources among all the channels. The present invention specifies a single multisample buffer subrectangle sized smaller than the total managed area that is both shared among multiple windows (e.g., W1 and W2 in FIG. 5) and repositionable within a particular window. The use of the present invention can be implemented through a software extension (e.g., SGIS_shared_multisample) which is predicated on specially configuring the window system, typically via a command line option added to the window system server'as startup command. When run in this mode, graphics applications see the shared multisample feature (extension) advertised by means of a special query routine. In this mode, the behavior of multi-sample extension changes. Instead of the multisample buffer memory being retained per-pixel across the entire managed, multisample memory is shared among multisample windows and repositionable within a multisample window. Switching windows or repositioning the multisample subrectangle will make undefined the shared state within the multisample, depth, stencil, and accumulation buffers. When rendering into a multisample window, fragments that fall outside the window'as multisample subrectangle are discarded (e.g., scissored). By default, the window'as multisample rectangle is positioned at its window origin. But for the example shown in FIG. 5, a single multisample memory is used to perform multisampling for the two windows, W1 and W2, that are of arbitrary shape and position. Thus, a single multisample memory can be used to perform multisampling for different portions of a single display screen. For example, if there are only two areas which have a high degree of three-dimensional image quality, a single multisample memory can be used to successively multisample each of those two portions.

Thus, an apparatus and method for sharing and reusing a section of multisample memory amongst multiple displays is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method for generating three-dimensional images, comprising the steps of:
  establishing a first section of memory for storing multi-sampled pixel values;
  establishing a second section of memory for storing final pixel values used to render the three-dimensional images;
  performing multisampling on pixels corresponding to a first display area;
  storing multisampled pixel values of the first display area in the first section of memory;
  generating final pixel values of the first display area as a function of the multisampled pixel values of the first display area;
  storing the final pixel values of the first display area in the second section of memory;
  performing multisampling on pixels corresponding to a second display area;
  reusing the first section of memory to store multisampled pixel values of the second display area;
  generating final pixel values of the second display area as a function of the multisampled pixel values of the second display area;
  storing the final pixel values of the second display area in the second section of memory;
  rendering the final pixel values from the second section of memory for display.

2. The method of claim 1, wherein the first section of memory covers a subset of an entire display area and the second section of memory covers the entire display area.

3. The method of claim 2, wherein the first display area corresponds to a first channel for driving a first display monitor and the second display area corresponds to a second channel for driving a second display monitor.

4. The method of claim 2, wherein the first display area corresponds to a first window and the second display area corresponds to a second window.

5. The method of claim 2, wherein the first section of memory includes color, depth, and stencil buffers.

6. The method of claim 2, wherein the second section of memory is a frame buffer.

7. A method for generating three-dimensional images on a computer system, comprising the steps of:
  sampling pixels of a first section of a display;
  storing sampled pixel values of the first section of the display in a memory;
  sampling pixels of a second section of the display;
  storing sampled pixel values of the second section of the display in the memory that was previously used to store the sampled pixel values of the first section of the display, wherein the memory stores the sampled pixel values of the second section of the display in place of the sampled pixel values of the first section of the display.

8. The method of claim 7 further comprising the steps of:
  generating final pixel values according to the sampled pixel values;
  storing the final pixel values in a frame buffer;
  rendering the final pixel values from the frame buffer for display while pixels are being sampled.

9. The method of claim 8, wherein the first section of the display corresponds to a first computer monitor and the second section of the display corresponds to a second computer monitor.

10. The method of claim 8, wherein the first section of the display corresponds to a first window and the second section of the display corresponds to a second window.

11. The method of claim 8, wherein the memory includes color, depth, and stencil values.

12. A computer system, comprising:

a multisample circuit which performs multisampling on pixels belonging to a first display area and on pixels belonging to a second display area;

a multisample memory coupled to the multisample circuit which successively stores sampled pixel values belonging to the first display area and sampled pixel values belonging to the second display area at different times, wherein the multisample memory is only large enough to store either the sampled pixel values belonging to the first display area or the sampled pixel values belonging to the second display area;

a frame buffer coupled to the multisample memory that stores final pixel values for the first display area and the second display area;

a render circuit coupled to the frame buffer which renders the three-dimensional image based on the final pixel values;

one or more displays coupled to the render circuit for displaying the three-dimensional images.

13. The computer system of claim 12, wherein the multisample memory covers a subset of the entire display area.

14. The computer system of claim 12, wherein the multisample memory is shared between the first display area and the second display area.

15. The computer system of claim 12, wherein the first display area corresponds to a first display screen of a first computer monitor and the second display area corresponds to a second display screen of a second computer monitor.

16. The computer system of claim 12, wherein the first display area corresponds to a first window and the second display area corresponds to a second window.

17. The computer system of claim 12, wherein the multisample memory includes color, depth, and stencil values.

* * * * *